United States Patent
Konz et al.

(10) Patent No.: US 8,474,560 B1
(45) Date of Patent: Jul. 2, 2013

(54) INVERTER MOUNTING ON AN ELECTRIC DRIVE LOADER

(75) Inventors: Jeffrey J. Konz, Dubuque, IA (US); Joshua D. Graeve, Peosta, IA (US); Devendra Thakur, Pune (IN); Mark J. Cherney, Potosi, WI (US); Michael J. Ackerman, Peosta, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/338,519

(22) Filed: Dec. 28, 2011

(51) Int. Cl.
*B60R 16/04* (2006.01)

(52) U.S. Cl.
USPC .......................................... 180/68.5

(58) Field of Classification Search
USPC ............. 180/65.21, 68.5, 65.1, 54.1; 363/141
See application file for complete search history.

(56) References Cited

U.S. PATENT DOCUMENTS

| | | | |
|---|---|---|---|
| 3,952,826 A | * | 4/1976 | Barker et al. .................. 180/420 |
| 7,145,788 B2 | * | 12/2006 | Plummer ....................... 363/141 |
| 2011/0130901 A1 | * | 6/2011 | Mori et al. ....................... 701/22 |

* cited by examiner

*Primary Examiner* — John Walters
*Assistant Examiner* — James Triggs
(74) *Attorney, Agent, or Firm* — Stephen F. Rost; Taft, Stettinius & Hollister, LLP

(57) ABSTRACT

The present disclosure provides a work machine having a frame and a front and rear wheel axle. The machine includes a cab coupled to the frame. The cab is configured to include controls for controlling the operation of the work machine. The machine also includes an electrically-powered drive assembly coupled to the frame and front and rear axles and an inverter electrically coupled to the electrically-powered drive assembly. The machine further includes a platform assembly disposed adjacent the cab and coupled to the frame. The platform assembly comprises an outer wall at least partially surrounding the inverter.

20 Claims, 7 Drawing Sheets

INVERTER MOUNTING ON AN ELECTRIC DRIVE LOADER

FIELD OF THE INVENTION

The present invention relates to an electric drive loader, and in particular to mounting an inverter to an electric drive loader.

BACKGROUND OF THE INVENTION

Work vehicles such as a loader can be used in construction for loading material into and onto other types of machinery. A conventional loader, e.g., front loader, bucket loader, front end loader, etc., is a type of tractor with a front-mounted bucket connected to the end of two booms for scooping material from the ground. The loader can include front and rear wheels, or in alternative forms, it may include tracks. The loader can also include a hydraulically-actuated pivot point disposed between the front and rear axes to provide articulated steering. Articulated steering can provide enhanced maneuverability for a given wheelbase.

A conventional loader, such as the John Deere 844K Wheel Loader, can include a conventional fuel-injection engine and transmission with a torque converter. An example of a powertrain and drive assembly for a conventional loader is shown in FIG. 1. The powertrain and drive assembly 100 includes a conventional engine 102 and torque converter transmission 104. The transmission 104 can be a 5-speed transmission with torque converter lockup in different gear ranges for better acceleration, speed cycles, power and fuel efficiency during transport, and ramp climbing. One or more hydraulic pumps 112 can be mounted to the transmission 104 and operated at engine speed. The conventional loader further includes a front axle 106 and a rear axle 108 to which wheels or tracks can be mounted. A driveline 110 is disposed between the transmission 104 and front axle 106 and rear axle 108 for transferring power thereto.

New technology, however, is being introduced to provide an electric drive loader. As technology pushes toward electric drive, and away from torque converter transmissions, new hardware and additional components are required for the electrification of the loader. As a result, there are challenges in packaging the new hardware and components within the loader without changing or modifying the design of the loader. For example, an inverter is required for an electric drive loader to converter direct current (DC) to alternating current (AC). The layout and space restrictions of the loader, however, make it difficult to find a location for the inverter that provides adequate protection from surrounding elements.

A need therefore exists to provide a packaging layout of an electric drive loader with an inverter that meets the space requirements of the loader and provides adequate protection to the inverter. In addition, it is desirable to package the inverter in a location that provides easy accessibility thereto for servicing, easy assembly, and a short routing of high voltage cables between the inverter and generator.

SUMMARY

In an exemplary embodiment of the present disclosure, a work machine is provided having a frame and a front and rear wheel axle. The machine includes a cab coupled to the frame such that the cab is configured to include controls for controlling the operation of the work machine. The machine also includes an electrically-powered drive assembly coupled to the frame and front and rear axles and an inverter electrically coupled to the electrically-powered drive assembly. A platform assembly is disposed adjacent the cab and coupled to the frame. The platform assembly comprises an outer wall at least partially surrounding the inverter.

In one aspect of this embodiment, the outer wall substantially encloses the inverter. In a different aspect, the outer wall comprises a plurality of outer walls that form an outer enclosure such that the outer enclosure defines an interior space into which the inverter is disposed. The outer wall can form a top step adjacent the cab.

In another aspect of this embodiment, the electrically-powered drive assembly can include an engine; a generator coupled to the engine and adapted to convert mechanical energy from the engine into electrical energy; an electric motor adapted to receive the electrical energy from the generator and convert to mechanical energy; a hybrid transmission coupled to the electric motor and adapted to receive the mechanical energy from the electric motor; and a first driveline coupled between the transmission and front wheel axle and a second driveline coupled between the transmission and rear wheel axle. In addition, a first electric cable can be coupled between the inverter and generator and a second electric cable coupled between the inverter and electric motor. A splitter box can be coupled between the engine and generator.

Related to this embodiment, a staircase entry can be provided to the cab. The staircase entry can include a plurality of steps and support frame coupled to the frame of the machine. The staircase entry can also be coupled to the platform assembly. In addition, the platform assembly can be disposed on the same side of the machine as an entrance to the cab. In a further aspect of this embodiment, the outer wall of the platform assembly can include a plurality of removably coupled panels. The outer wall can also define a plurality of openings through which electric cables pass for coupling the inverter to the electrically-powered drive assembly.

In another embodiment, an electric drive loader is provided. The electric drive loader includes a front frame assembly and a rear frame assembly, wherein the front frame assembly and rear frame assembly are adapted to be coupled to one another about an articulation joint. A front axle and a rear axle are also provided such that front ground engaging wheels are coupled to the front axle and rear ground engaging wheels are coupled to the rear axle. A cab is coupled to the front or rear frame and includes an entrance opening on at least one side of the loader. The loader further includes an engine configured to produce mechanical energy, a generator coupled to the engine and configured to convert the mechanical energy from the engine to electrical energy, and an electric motor configured to receive the electrical energy from the generator and convert to mechanical energy. A hybrid transmission is coupled to the electric motor and is adapted to receive the mechanical energy from the electric motor. The loader includes an inverter electrically coupled to the generator and motor and a platform assembly disposed adjacent the entrance opening. The platform assembly is coupled to the frame and comprises an outer wall at least partially surrounding the inverter.

In one aspect of this embodiment, the outer wall substantially encloses the inverter. In another aspect, the outer wall comprises a plurality of outer walls that form an outer enclosure, the outer enclosure defining an interior space into which the inverter is disposed. In a different aspect, the outer wall forms a top step adjacent the entrance opening of the cab.

The electric drive loader can include a first electric cable coupled between the inverter and generator and a second electric cable coupled between the inverter and electric motor. The outer wall of the platform assembly can define a plurality of openings through which the first and second electric cables pass for coupling the inverter to the generator and electric motor, respectively. The loader can further include a staircase to the cab, where the staircase entry comprises a plurality of steps and support frame coupled to the platform assembly. In addition, the platform assembly is disposed on the same side of the loader as the entrance opening.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
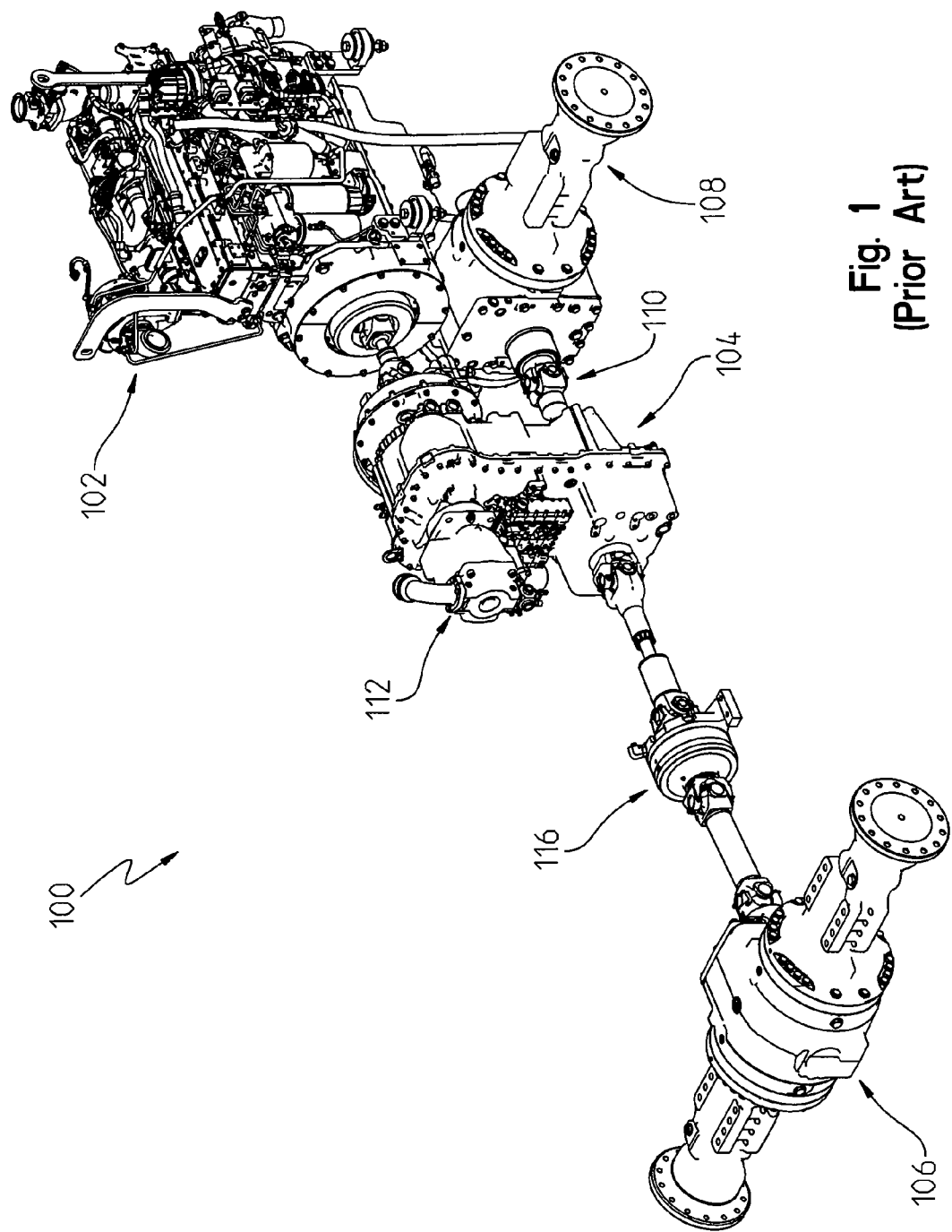
FIG. 1 is a perspective view of a conventional powertrain and drive assembly of a loader.
Figure 2:
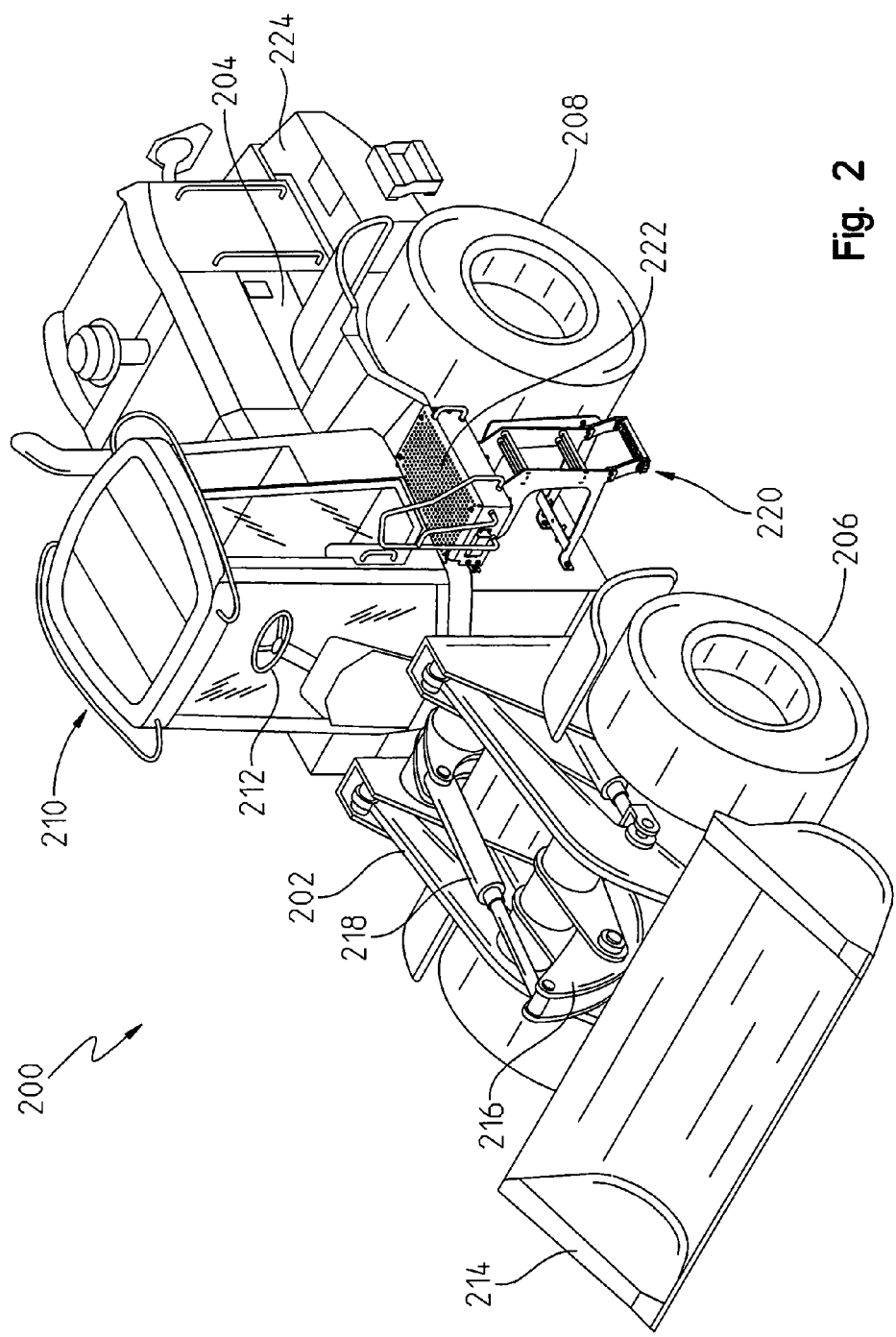
FIG. 2 is a perspective view of an electric drive loader.

With reference to FIG. 2 of the present disclosure, a work vehicle such as a front loader 200 is shown. The vehicle 200 includes a front frame 202 and a rear frame assembly 204 that are pivotally joined together at an articulation pivot or joint (not shown). Front ground engaging wheels 206 are coupled to the front frame 202 and rear ground engaging wheels 208 are coupled to the rear frame 204 for supporting and propelling the vehicle 200. Although the present disclosure illustrates a front loader 200, it is not limited to such and may include other suitable work vehicles.

The front frame assembly 102 is provided with a work implement in the form of a loader bucket 214 that is controllably coupled to the front frame assembly 202 by a coupler or mechanical linkage 216. The bucket 214 can be actuated by a hydraulic cylinder 218 which is coupled to the coupler 216. In other embodiments, the front frame assembly 102 can be coupled with a pair of forks, a blade, a rotary tiller, a roller level, a rotary cutter, a trencher, and other known work implements. The rear frame assembly 204 can include an operator cab 210 in which an operator controls the vehicle 200 using vehicle controls 212. The vehicle controls 212 can include a joystick or steering wheel for controlling movement of the front ground engaging wheels 206 and rear ground engaging wheels 208 and articulating the front frame assembly 202 relative to the rear frame assembly 204.

The work vehicle 200 can include a cab entrance 220 defined as an opening in the cab 210. A set of steps and front platform 222 provide easy access to the operator's cab 210. A rear platform 224 is also shown in FIG. 2 mounted to the rear frame 204.

Figure 3:
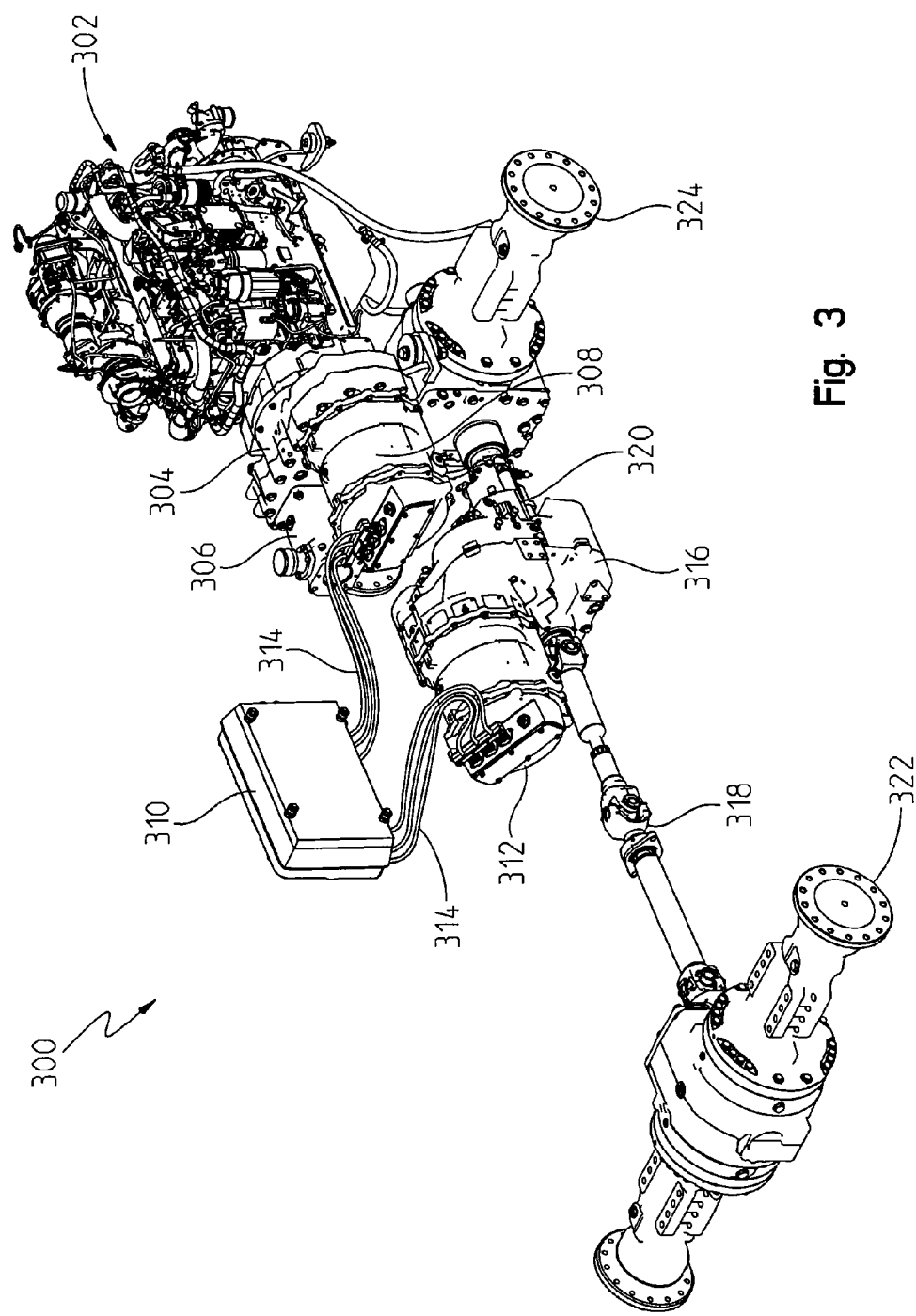
FIG. 3 is a perspective view of one embodiment of a packaging layout of a powertrain and drive assembly of the electric drive loader of FIG. 2.

Referring to FIG. 3, an embodiment is provided illustrating the layout of an electric powertrain and drive assembly 300 of the work vehicle 200. The assembly 300 includes an engine 302 which is disposed near the rear frame 204 of the vehicle 200. The engine 300 is designed to operate at an approximately constant speed for improved fuel efficiency and consistent boom and bucket response. The engine 300 is structured to provide power to a generator 308 and hydraulic pump 306. The generator 308 and hydraulic pump 306 are disposed adjacent to one another in FIG. 3, but in an alternative embodiment, the two components can be arranged in axial alignment or otherwise. In FIG. 3, a splitter box assembly 304 is coupled between the engine 302 and hydraulic pump 306 and generator 308. The splitter box 304 is structured to enable the hydraulic pump 306 and generator 308 to be packaged adjacent to one another.

During operation, the generator 308 can convert mechanical energy from the engine 302 into electrical energy. The generator 308 can produce alternating current (AC). An inverter 310, which is coupled to the generator 308 via cables 314, can then convert the alternating current (AC) from the generator 308 into direct current (DC). The direct current can be used for controlling an electric motor 312, which is also coupled to the inverter 310 via another set of cables 314. The inverter 310 can converter the direct current (DC) back to alternating current (AC) and supply this to the generator 308. The electric motor 312 can convert the electrical energy supplied by the generator 308 into mechanical energy to drive an electric drive transmission 316. The transmission 316 can be a three-speed transmission, for example, that provides speed reduction from the motor 312 to the vehicle's driveline. In FIG. 3, the vehicle includes a front driveline 318 that is coupled between the transmission 316 and front axle 322. Similarly, the vehicle 200 includes a rear driveline 320 that is coupled between the transmission 316 and rear axle 324.

The packaging layout of the components in FIG. 3 is such that the inverter 310 is coupled on the opposite side of the vehicle 200 from the cab entrance 220. Here, the inverter 310 can be disposed in a location previously occupied by the vehicle's battery box (not shown).

Figure 4:
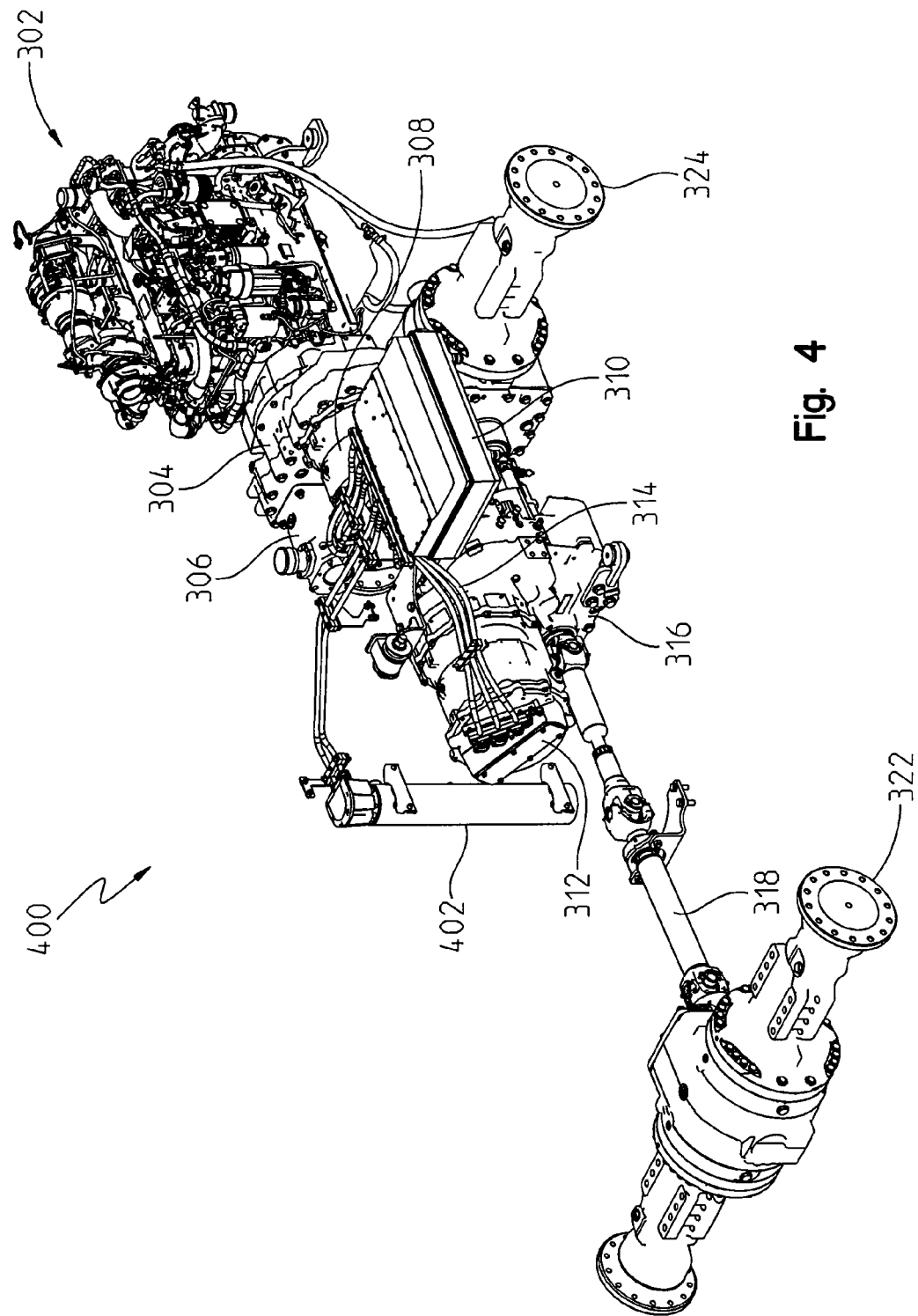
FIG. 4 is a perspective view of another embodiment of a packaging layout of a powertrain and drive assembly of the electric drive loader of FIG. 2.

In an alternative embodiment, a different packaging configuration 400 of the components is shown in FIG. 4. In this configuration 400, the inverter 310 is disposed on the same side of the vehicle 200 as the cab entrance 220. In particular, and as will be further described, the inverter 310 can be disposed in a partially enclosed compartment defined by the front platform 222. In this location, the routing of the high voltage cables 314 between the inverter 310 and generator 308 and motor 312, respectively, can be desirably short. Also shown in FIG. 4 is a brake resistor 402. The brake resistor 402 can dissipate braking energy not being used for boom and bucket functionality and further reduces brake wear and usage.

With the conventional torque converter transmission being replaced by an electric hybrid transmission 316, the packaging and layout of the vehicle included tight spacing requirements for accommodating the inverter 310. In a non-limiting embodiment, the inverter 310 can have approximate dimensions of 1'×2½'×10". The inverter 310 can have different dimensions depending on type of vehicle and space requirements.

Figure 5:
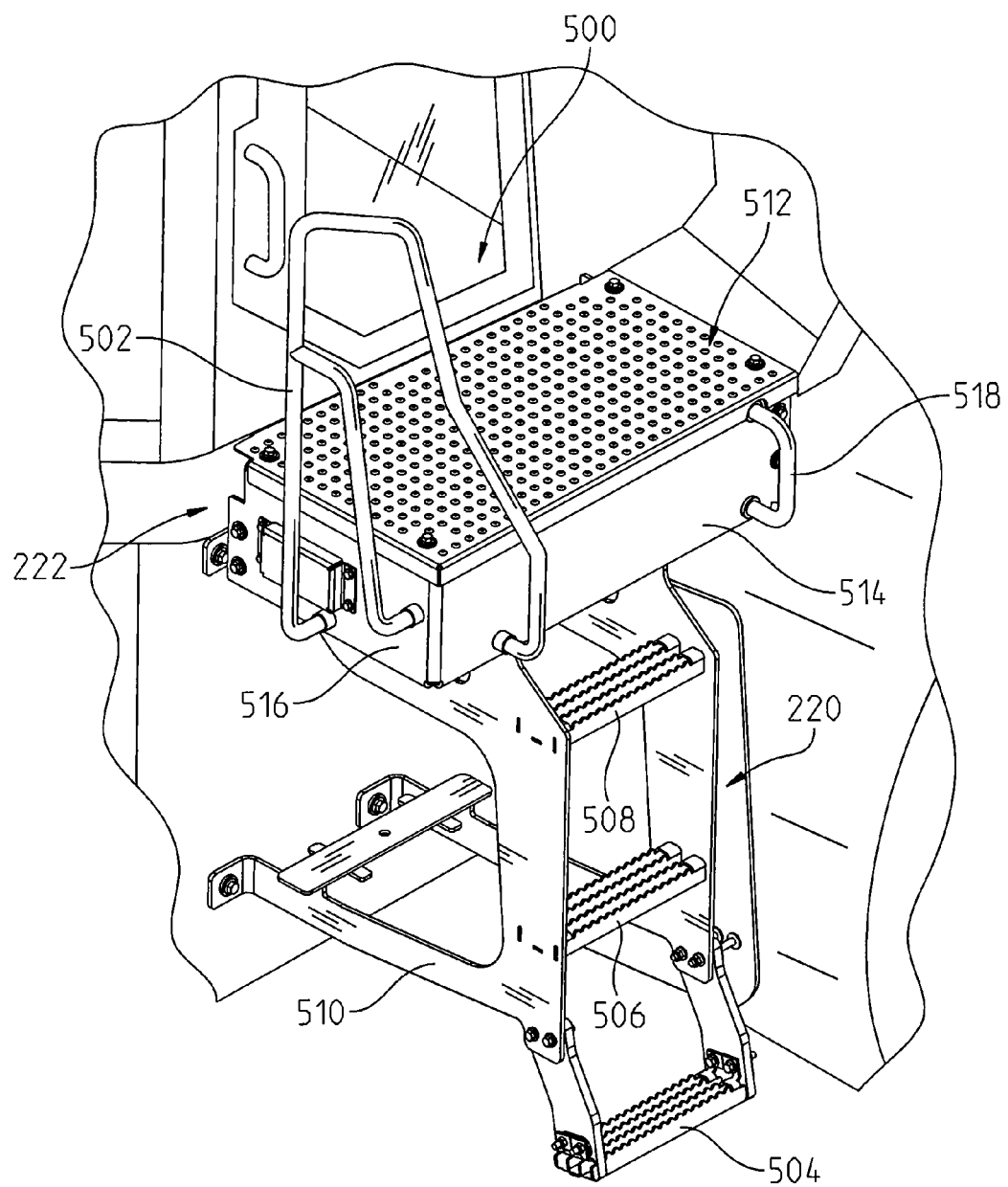
FIG. 5 is a partial perspective view of a cab entrance and front platform of the loader of FIG. 2.

Referring to FIG. 5, the cab entrance 220 of the vehicle 200 is shown in greater detail. The cab entrance 220 is configured on the left side of the vehicle 200 and includes a defined opening 500 in one side of the operator's cab 210 to allow entry and exit therefrom. In addition, the cab entrance 220 includes the staircase entry 220 formed by a first step 504, a second step 506, and a third step 508. In other embodiments, the staircase entry 220 can include additional or fewer steps to gain entry to the cab entrance 220. The staircase entry also includes a frame 510 to provide support to the steps. The front platform 222 is disposed at the top of the staircase entry 220 and adjacent to the defined cab opening 500. A handle or handrail 502 can be provided for ascending/descending the steps and assisting assistance to and from the cab 210.

Figure 6:
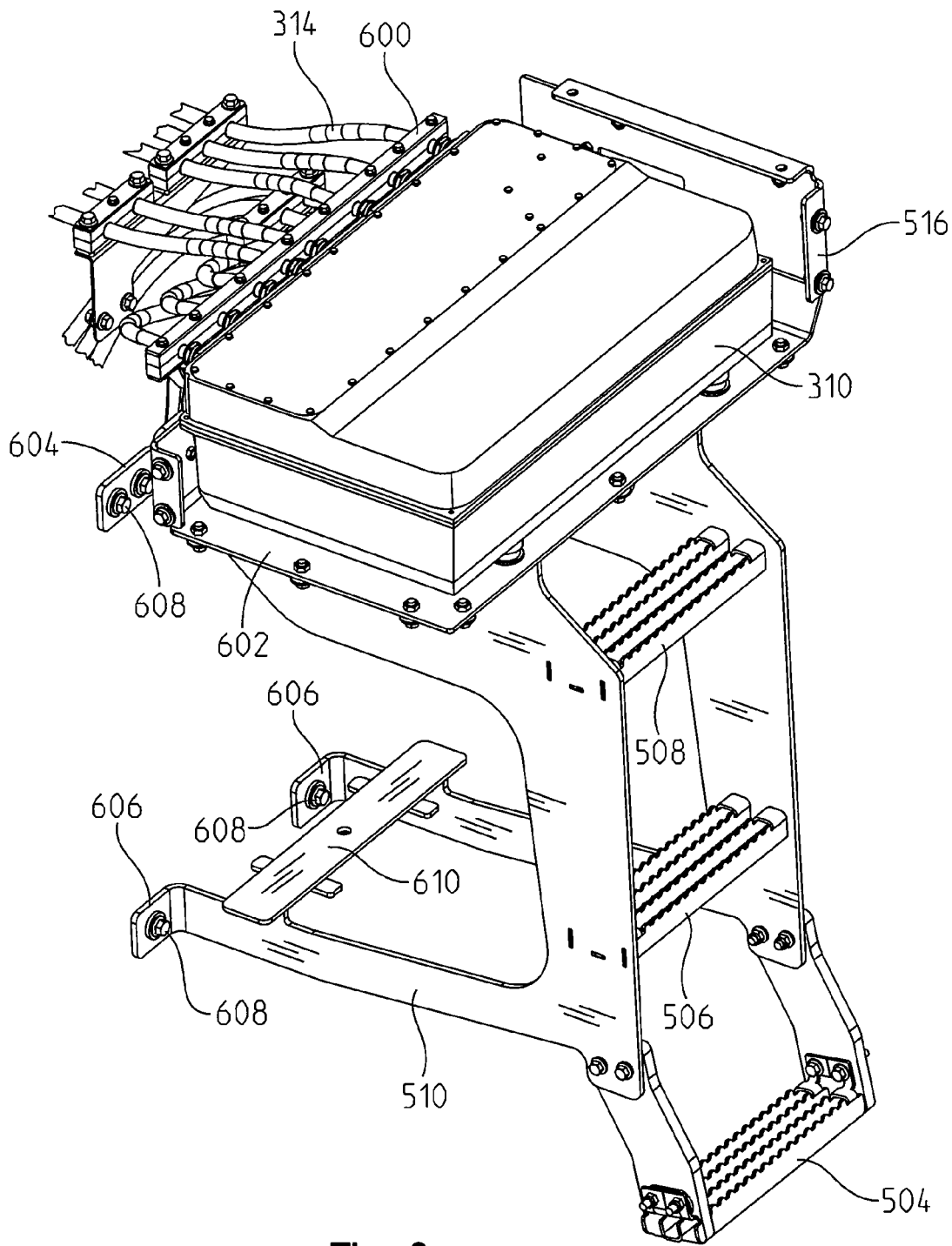
FIG. 6 is another partial perspective view of the front platform and inverter mounting location of FIG. 5.

The front platform 222 can be defined by a top surface 512, a pair of side surfaces 516, a front surface 514, a rear surface 600 (FIG. 6), and a bottom surface 602 (FIG. 6). The top surface 512 can include a plurality of raised dimples to provide better traction when climbing into and out of the cab 210. In addition, a handle 518 can be coupled to the front surface 514 to assist with traversing the staircase entry 220.

Figure 7:
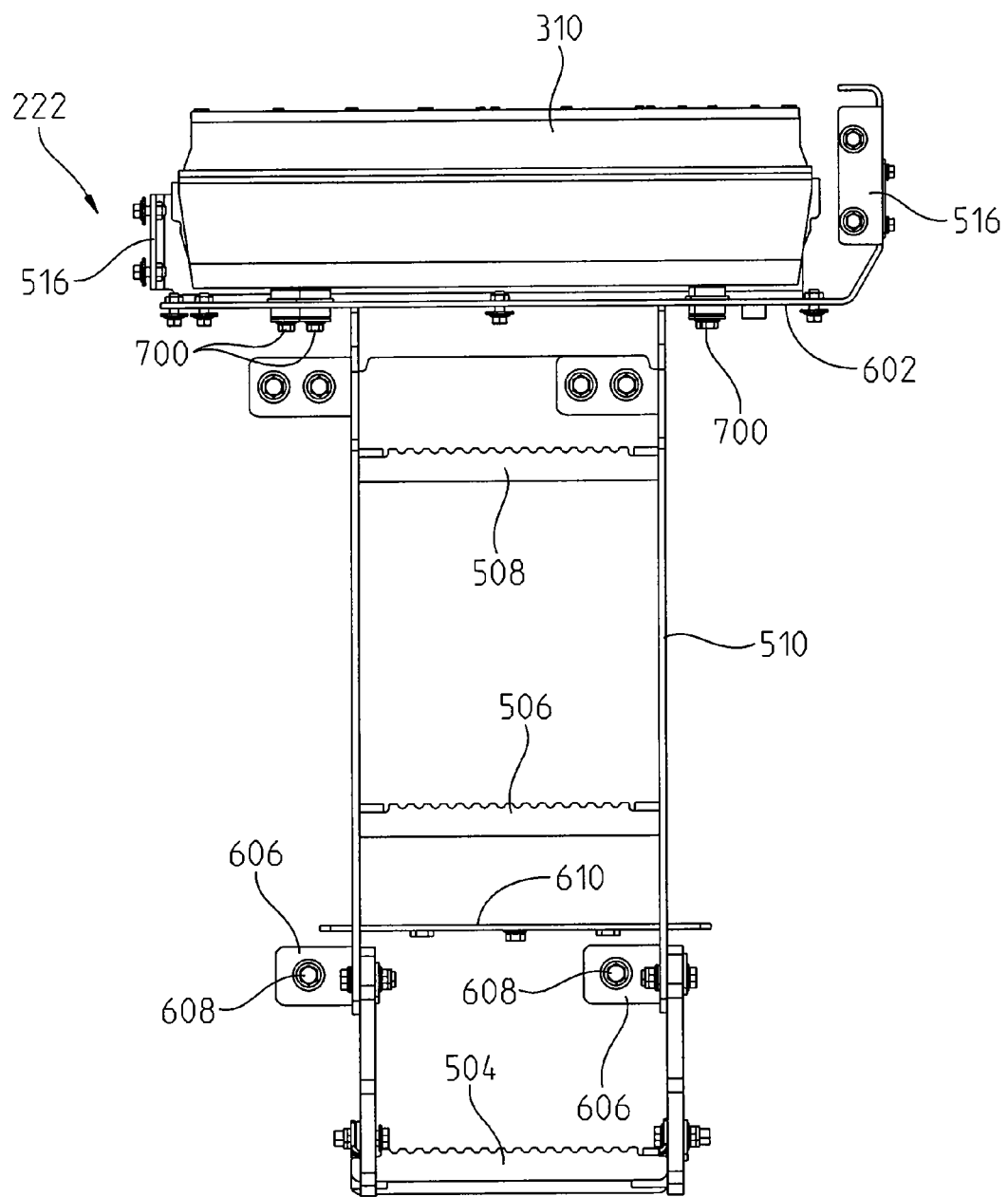
FIG. 7 is a schematic front view of the cab entrance and inverter mounting location of FIG. 5.

With reference to FIGS. 6 and 7, the plurality of surfaces of the front platform 222 can define an interior compartment into which the inverter 310 is disposed. The inverter 310 can be at least partially enclosed by the plurality of surfaces to protect the inverter 310 from the surrounding environment. The front platform 222 also allows the inverter 310 to be disposed in a convenient location in the event it needs to be serviced or replaced. It is also conveniently located for assembly purposes. The rear surface 600 can define a plurality of openings through which the cables 314 can pass for coupling to the inverter 310.

As shown in FIG. 6, the staircase entry frame 510 can include flanges 604, 606 for coupling to the side of the vehicle 200. A lateral frame member 610 can provide further support to the staircase entry frame 510. Fasteners 608, such as bolts, screws, etc., can be used to mount the flanges 604, 606 to the side of the vehicle 200. In FIG. 7, similar fasteners 700 can be used for coupling the inverter 310 to the bottom surface 602 of the front platform 222. For example, the inverter 310 can include threaded openings for coupling to the bottom surface 602. The inverter 310 can also be coupled to one of the two side surfaces 516, top surface 512, front surface 514, or the rear surface 600. Each of the front surface 514, rear surface 600, side surfaces 516, bottom surface 602 and top surface 512 can be removably coupled panels thereby forming the front platform 222. In this instance, any one of the panels can be removed to perform service actions on the inverter 310. In any event, the inverter 310 can be stably coupled to the platform 222 to prevent it from being damaged during vehicle operation.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A work machine having a frame and a front and rear wheel axle, comprising:
   a cab coupled to the frame, the cab configured to include controls for controlling the operation of the work machine;
   an electrically-powered drive assembly coupled to the frame and front and rear axles;
   an inverter electrically coupled to the electrically-powered drive assembly; and
   a platform assembly disposed adjacent the cab, coupled to the frame, the platform assembly comprising an outer wall and forming a compartment that is sized to receive only the inverter, the outer wall at least partially surrounding the inverter.

2. The work machine of claim 1, wherein the outer wall substantially encloses the inverter.

3. The work machine of claim 1, wherein the outer wall comprises a plurality of outer walls that form an outer enclosure, the outer enclosure defining an interior space into which the inverter is disposed.

4. The work machine of claim 1, wherein the outer wall forms a top step adjacent the cab.

5. The work machine of claim 1, wherein the electrically-powered drive assembly comprises:
   an engine;
   a generator coupled to the engine and adapted to convert mechanical energy from the engine into electrical energy;
   an electric motor adapted to receive the electrical energy from the generator and convert to mechanical energy;
   a hybrid transmission coupled to the electric motor and adapted to receive the mechanical energy from the electric motor; and
   a first driveline coupled between the transmission and front wheel axle and a second driveline coupled between the transmission and rear wheel axle.

6. The work machine of claim 5, further comprising a first electric cable coupled between the inverter and generator and a second electric cable coupled between the inverter and electric motor.

7. The work machine of claim 5, further comprising a splitter box coupled between the engine and generator.

8. The work machine of claim 1, further comprising a staircase entry to the cab, where the staircase entry comprises a plurality of steps and support frame coupled to the frame of the machine.

9. The work machine of claim 7, wherein the staircase entry is coupled to the platform assembly.

10. The work machine of claim 1, wherein the platform assembly is disposed on the same side of the machine as an entrance to the cab.

11. The work machine of claim 1, wherein the outer wall comprises a plurality of removably coupled panels.

12. The work machine of claim 1, wherein the outer wall defines a plurality of openings through which electric cables pass for coupling the inverter to the electrically-powered drive assembly.

13. An electric drive loader, comprising:
   a front frame assembly and a rear frame assembly,
   a front axle and a rear axle, where front ground engaging wheels are coupled to the front axle and rear ground engaging wheels are coupled to the rear axle;
   a cab coupled to the front or rear frame, the cab including an entrance opening on at least one side of the loader;
   an engine configured to produce mechanical energy;
   a generator coupled to the engine, the generator configured to convert the mechanical energy from the engine to electrical energy;

an electric motor configured to receive the electrical energy from the generator and convert to mechanical energy;

a hybrid transmission coupled to the electric motor, the transmission adapted to receive the mechanical energy from the electric motor;

an inverter electrically coupled to the generator and motor; and a platform assembly disposed adjacent the entrance opening and coupled to the frame, the platform assembly comprising a top surface, a bottom surface, and an outer wall at least partially surrounding an inverter;

wherein the top surface forms an uppermost step substantially aligned with the entrance opening;

further wherein the top surface, bottom surface, and outer wall define an internal compartment for receiving only the inverter.

14. The electric drive loader of claim 13, wherein the outer wall substantially encloses the inverter.

15. The electric drive loader of claim 13, wherein the outer wall comprises a plurality of outer walls that form an outer enclosure, where at least the top surface, bottom surface, and plurality of outer walls are removably coupled to the platform assembly.

16. The electric drive loader of claim 13, wherein the top step includes a plurality of raised dimples for better traction.

17. The electric drive loader of claim 13, further comprising a first electric cable coupled between the inverter and generator and a second electric cable coupled between the inverter and electric motor.

18. The electric drive loader of claim 17, wherein the outer wall defines a plurality of openings through which the first and second electric cables pass for coupling the inverter to the generator and electric motor, respectively.

19. The electric drive loader of claim 13, further comprising a staircase to the cab, where the staircase entry comprises a plurality of steps and support frame coupled to the platform assembly.

20. The electric drive loader of claim 13, wherein the platform assembly is disposed on the same side of the loader as the entrance opening.

\* \* \* \* \*